Aug. 21, 1928.
B. E. GETCHELL
1,681,851
RESETTABLE RELAY
Filed Dec. 3, 1927
2 Sheets-Sheet 1
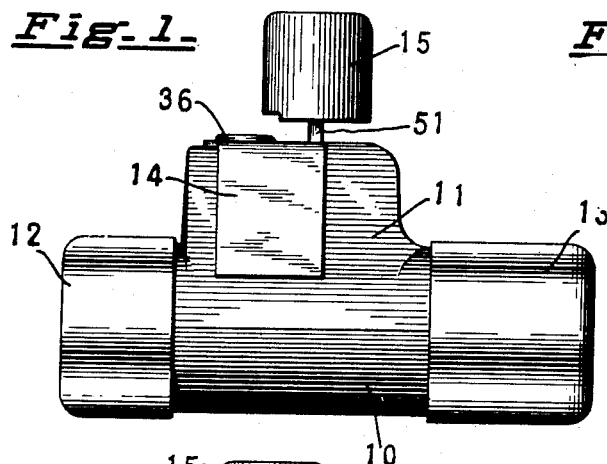
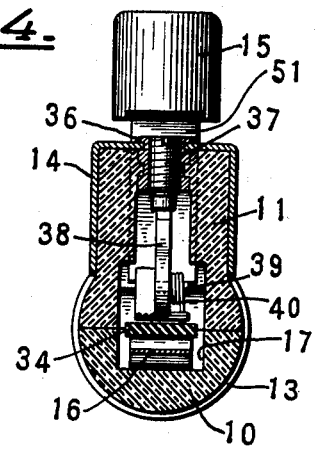
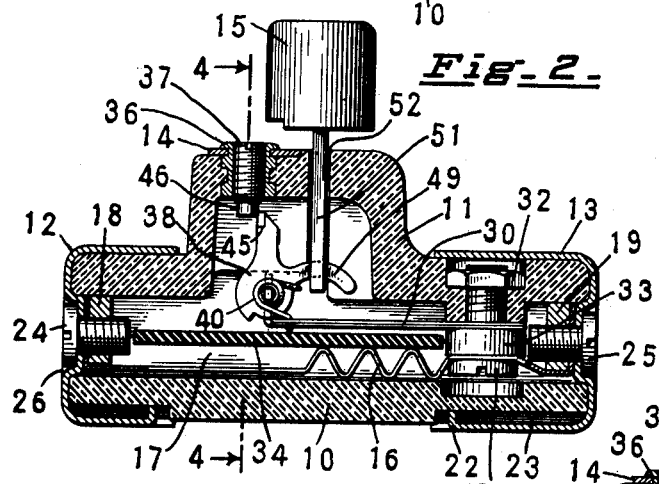
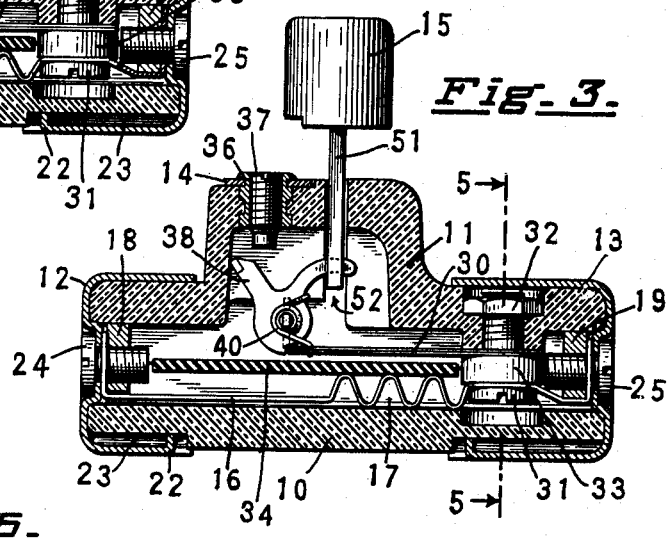
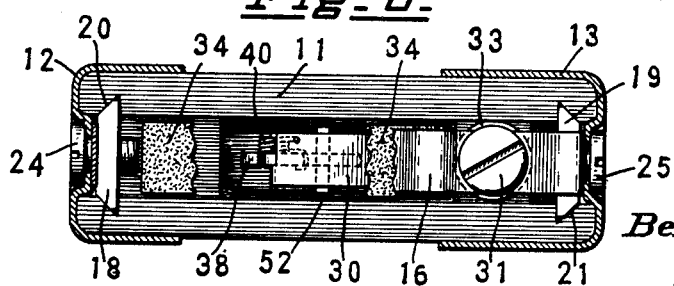
INVENTOR
Benjamin E. Getchell,
BY
ATTORNEY

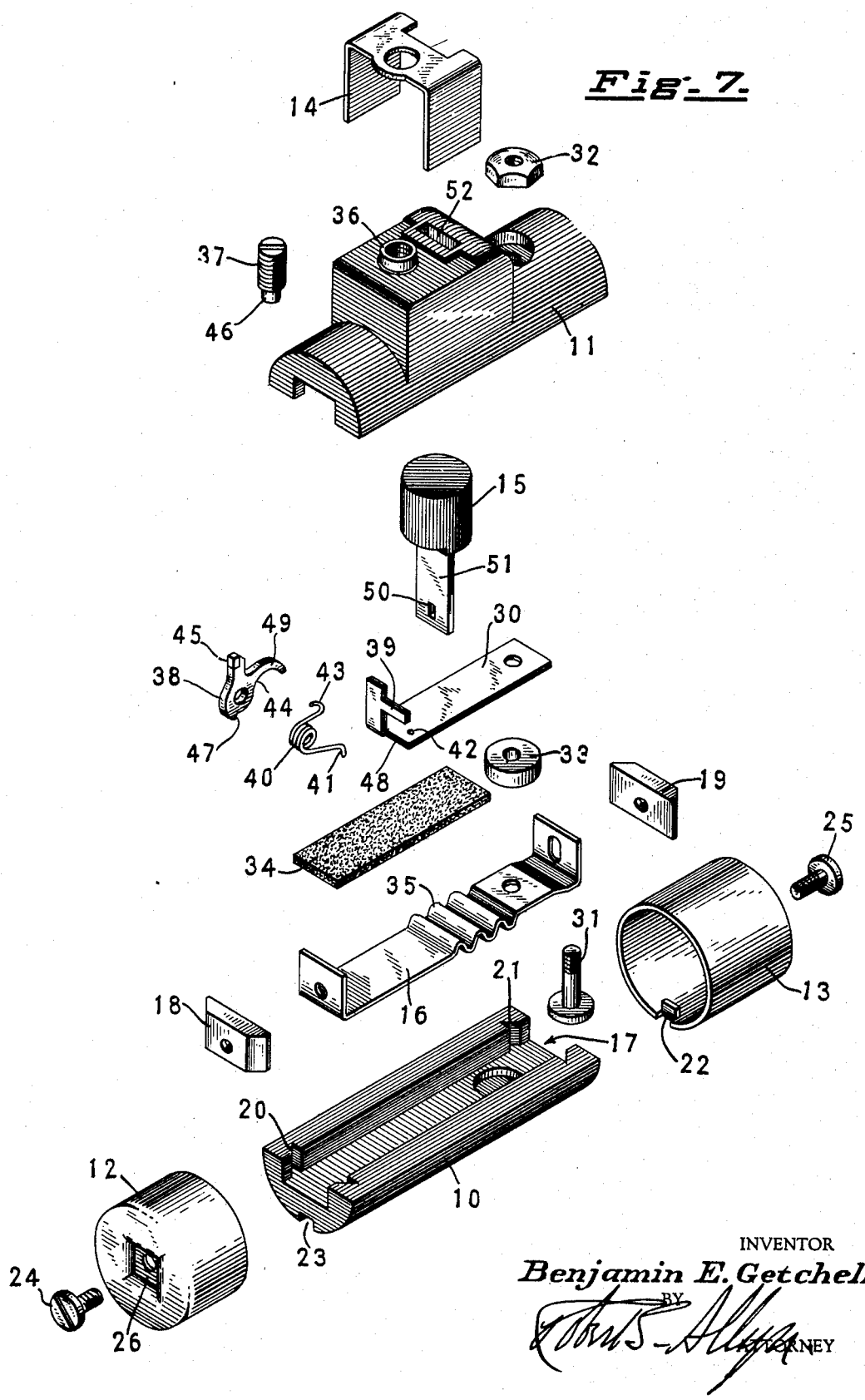

Patented Aug. 21, 1928.

1,681,851

UNITED STATES PATENT OFFICE.

BENJAMIN E. GETCHELL, OF PLAINVILLE, CONNECTICUT, ASSIGNOR TO THE TRUMBULL ELECTRIC MANUFACTURING COMPANY, OF PLAINVILLE, CONNECTICUT, A CORPORATION OF CONNECTICUT.

RESETTABLE RELAY.

Application filed December 3, 1927. Serial No. 237,437.

My invention relates to improvements in protecting devices for motor circuits and is intended to automatically open the circuit in case of a dangerous continued overload. It particularly relates to the protection of such motor installations, as are provided with means for automatically operating a motor switch under certain working conditions.

My former Patents 1,569,364, 1,569,803, 1,569,804 and 1,581,192 show thermostatic relays intended for the protection of motor circuits.

These former devices, however, are of the automatically re-setting or self-restoring type in which, on overload conditions, the thermostat of the relay opens the circuit through a cooperating magnetically controlled switch but, after such operation, the thermostat soon cools and again closes the contacts of the relay and would again close the motor circuit unless the main switch is of a type which must be closed by manual action.

My present invention contemplates a relay adapted for controlling a class of installations for which my forementioned devices are not entirely satisfactory because of their self-restoring feature.

Some installations include, for instance, motor driven apparatus for pumping air, gas or liquids and are so arranged that the motor-controlling switch is automatically operated at the beginning and the end of a cycle of work by means of a float switch, a thermostat or other equivalent means. In such constructions, relays of my former types would be useless as they would merely operate to alternately open and close the cicruit in response to the circuit controlling movement caused by the heating and cooling of the thermostat.

The float switch or thermostat first operates to throw the switch on at the predetermined time regardless of the electrical condition of the circuit or of the motor. In some cases there is a considerable lapse of time between the cycles of operation and it will readily be seen that in case of overload, considerable damage might be done to the motor or apparatus before the next automatic off operation of the circuit controlling means.

Because of the automatic operation of such installations, they are usually unattended and receive but scant attention while operating normally, therefore it is vitally necessary that means for protection against overload be provided and that this means should positively open the motor circuit on overload in such a way that the circuit cannot again be closed until the protective device has been operated deliberately and manually thus assuring the attention of a presumably competent person.

The general construction and some of the objects of my present invention are similar to my co-pending application Serial No. 188,244, but in the present development I have sought to improve the switching means and the resetting means. The switch has a snap action or quick break and is reset by a very simple and reliable push button.

One object of my present invention is to provide a relay in which the circuit will be opened surely and promptly in response to overload conditions in the circuit, or abnormal conditions in the motor, and yet, when the circuit is once open, it will remain open until the relay is intentionally reset.

Another object is to provide a thermostatic relay in which the circuit is opened with a snap action.

Another object is to provide a simple and convenient external push button means for resetting a thermostatic relay.

Another object is to provide a relay having a push button which may be operated manually to reset the overload trip after its automatic operation or to momentarily break the control circuit to open the switch.

Another object is to provide a relay having a thermostatically releasable, pivotally mounted snap switch member and a very simple but practical push button means for moving the switch member to a latched on position.

Another object is to provide a manually resettable thermostatic relay of such dimensions and character that it may be used interchangeably with relays of standard dimensions.

In the present embodiment herein shown and described the invention includes a thermostatic element and a heater strip mounted, as set forth in my co-pending application and former patents, but also includes a pivoted snap switch member, a spring for throwing the switch member to off position and an external push button for manually moving the switch member to a latched on position or, when so desired, for manually moving the switch member away from its cooperating contact so as to cause the opening of the circuit.

Fig. 1 is a side view of the relay embodying one form of my invention.

Fig. 2 is a longitudinal sectional view showing the parts in the normal closed circuit running position.

Fig. 3 is a similar sectional view showing the parts in the open circuit position.

Fig. 4 is a transverse sectional view on the plane of the line 4—4 of Fig. 2 looking in the direction of the arrows.

Fig. 5 is a transverse sectional view on the plane of the line 5—5 of Fig. 3.

Fig. 6 is a view looking upwardly into the upper member of the relay, the end caps being shown in section and parts being broken away.

Fig. 7 is an exploded perspective view showing various parts of the relay.

The housing or body of the relay is preferably formed of suitable insulating material and preferably split longitudinally into two parts, which, for convenience, will be termed the lower part 10 and the upper part 11. These parts are held together by end caps 12 and 13 formed of metal which serve as the main circuit terminals of the relay. The inverted U-shaped member 14 serves as the intermediate terminal of the relay. The push button 15 serves to reset the relay or to momentarily break the control circuit to open the switch.

The main conductor 16 of the relay is in the form of a metal strip which extends longitudinally in the channel 17 of the lower body member. The ends of the strip 16 are bent at right angles and overlap the outer faces of the metallic anchorage members 18 and 19 which fit into the notches 20 and 21 in the housing. The end caps are prevented from turning by integral lugs 22 which fit in grooves 23 in the housing or body member 10. The end caps 12 and 13 are held in place by the screws 24 and 25 which pass through the end caps and through the ends of the conductor strip 16 and into the anchorage pieces 18 and 19. The heads of the screws 24 and 25 are preferably seated and soldered in recesses, such as 26, so that they cannot accidentally work loose.

The bi-metallic thermostatic arm 30 and the conductor strip 16 are secured to the upper body member 11 by means of a bolt 31 having a nut 32. The strip 16 serves as the heater for warping or bending the thermostatic arm 30. Preferably I interpose a metallic disc or washer 33 between the strips 16 and 30 which washer has a predetermined rate of thermal conductivity. An insulating strip 34 formed, for instance, of asbestos is interposed between the movable part of the thermostatic strip 30 and the conductor strip 16, so that most of the heat effect from the strip 16 is conducted through the washer 33 which is designed to produce the desired time lag. The conductor strip 16 may be suitably designed for producing the desired resistance and heat effect, for instance, by providing the strip with a number of corrugations 35 near the conducting end and adjacent the thermal strip 30.

The terminal strip 14 is secured in place by an internally threaded tubular rivet 36 which serves as a seat for the adjustable contact screw 37 which serves as the stationary contact of the switch. The movable switch member 38 is pivotally supported on a finger 39 on the end of the thermostatic arm or strip 30. A spring 40 also mounted on the finger 39 has the end 41 set into a recess or perforation 42 in the arm 30 and the other end 43 caught around the underside of the projection 44 on the switch member 38. This spring 40 tends to turn the switch member 38 in a counter-clockwise curve as viewed in Figs. 2 and 3. When the circuit is closed the contact tip 45 of the switch member 38 is pressed against the contact tip 46 of the screw 37. When the circuit is open the shoulder 47 of the switch member 38 rests against the end 48 of the thermostatic strip 30. The switch member 38 is provided with a curved arm 49 which extends through an opening 50 in the shank 51 of the push button. This shank of the push button is guided in a passage 52 in the housing member 11. The screw 37 carrying the contact 46 is preferably adjustable so that the relay can be set to open the circuit at the desired overload, but the screw may be sealed as set forth in my Patent 1,569,364 to prevent tampering. When in use the parts are in the position shown in Fig. 2 with the circuit closed. In case of an excessive rise in current due to any cause the thermostatic arm 30 is warped by the heat from the conductor strip 16 and the switch member 38 is thus disengaged from the contact tip 46 whereupon the spring 40 snaps the switch member 38 to the open circuit position of Fig. 3 where the parts will remain in the open circuit position, even after the thermostatic strip cools off, until it is desired to reset the relay. Resetting is accomplished by simply pressing on the push button 15 which will bring the switch member 38 back into engagement with the contact tip 46 and close the auxiliary circuit.

It is sometimes desirable to manually break the circuit by means of the relay; this may be accomplished by pressing the button 15 which will move the switch member 38 out of engagement with the contact tip 46 and thus momentarily open the circuit and causes the opening of the switch.

It should be understood that the construction shown is that preferred for certain and special purposes. However, I do not consider the invention limited to the particular details disclosed except so far as they be required by the terms of the claims or the condition of the prior art.

I claim:

1. In a relay, a bendable bimetallic thermostatic strip having an angularly bent end with an integral pivot portion, a spring-pressed switch member mounted on said pivot portion, and an operating member for resetting said switch member.

2. In a relay, a warping thermostatic strip having an angularly bent end with an integral pivot portion, a spring-pressed switch member mounted on said pivot portion, said strip and switch member having coacting stops, and an operating member for resetting said switch member.

3. In a relay, a housing, a heater strip mounted therein, a bendable arm mounted adjacent said heater strip, a switch member pivotally carried by said arm, and an adjustable contact supported in said housing for said switch member.

4. In a relay, a housing, a heater element mounted therein, a bendable bimetallic thermostatic strip mounted adjacent said heater element, a switch member, a spring pivotally carried by said thermostatic strip and a contact supported in said housing coacting with said switch member.

5. In a relay, a housing having a passage and a contact member mounted adjacent thereto, a thermostatically releasable spring-pressed pivoted switch member in the housing and a push button having a shank guided in said passage and connected to the switch member for resetting the same.

6. In a relay, a housing, a heater element mounted therein, a bendable bimetallic thermostatic strip mounted adjacent said heater element, a switch member pivotally carried by said thermostatic strip, an adjustable contact supported in said housing and a push button supported in said housing and having operable connection with said switch member.

7. In a relay, a housing, a heater strip mounted therein, a bendable bimetallic arm mounted adjacent said heater strip, a spring-pressed switch member pivotally carried by and movable with said arm, a contact for said switch member supported in said housing and a push button supported in said housing and coacting with said switch member for resetting said member.

8. A relay comprising an insulating housing enclosing a heater element and a thermostatic strip, a switch member carried by said thermostatic strip and having an extending arm and an external operating member having a shank coacting with said arm for resetting the switch member.

9. A relay comprising a two-part housing enclosing a heater strip and a thermostatic strip, a switch member pivoted to said thermostatic strip and having a curved arm and an external operating member having a shank coacting with said curved arm for resetting the switch member.

10. A relay comprising a current-carrying heater element, a warping bimetallic element, a spring-pressed switch member carried by said bimetallic element, a stationary contact abutment for said switch member and a push button for resetting said switch member.

11. A relay including a current-carrying heater strip, a warping element adjacent thereto, a spring-pressed switch member pivotally carried by said warping element, a stationary contact abutment for said switch member and a finger piece for resetting said switch member.

12. A relay comprising a housing having a longitudinal channel with an extension, a heater strip and a thermostatic arm mounted in proximity to the heater strip in said channel, a switch member pivoted to the arm and in the extension, a stationary contact coacting with said switch member and an external push button for resetting said switch member.

13. A relay including a bimetallic thermostatic strip, a spring pressed switch member pivotally mounted on said strip, a heater element for said strip, a relatively stationary contact for said switch member and manual control means having operable connections with said switch member for moving said member from off position into latched engagement with said stationary contact to close the circuit or for moving said switch member away from said stationary contact to interrupt the circuit.

14. A relay including a thermally bendable element, a switch member pivotally mounted on said element, a resistance heater for said element, a relatively stationary contact for said switch member and a push button having operable engagement with said switch member for moving said member from off position into latched engagement with said stationary contact to close the circuit and for moving said switch member away from said stationary contact to interrupt the circuit.

BENJAMIN E. GETCHELL.